United States Patent [19]

Inoue

[11] Patent Number: 5,297,267
[45] Date of Patent: Mar. 22, 1994

[54] SYSTEM AND METHOD FOR SERIALIZATION CONTROL OF ACCESSES TO A COMMON MAIN STORAGE

[75] Inventor: Aiichiro Inoue, Yokohama, Japan

[73] Assignee: Fujitsu Limited, Kawasaki, Japan

[21] Appl. No.: 420,780

[22] Filed: Oct. 12, 1989

[30] Foreign Application Priority Data

Oct. 12, 1988 [JP] Japan ................................ 63-256604

[51] Int. Cl.$^5$ ........................ G06F 13/00; G06F 13/16
[52] U.S. Cl. ............................. 395/425; 364/DIG. 7; 395/550
[58] Field of Search ... 364/200 MS File, 900 MS File; 395/425, 550, 200

[56] References Cited

U.S. PATENT DOCUMENTS

| | | | |
|---|---|---|---|
| 4,152,764 | 5/1979 | Connors et al. | 395/425 |
| 4,426,681 | 1/1984 | Bacot et al. | 395/425 |
| 4,663,709 | 5/1987 | Fujiwara et al. | 395/725 |
| 4,745,548 | 5/1988 | Blahut | 395/325 |
| 4,754,398 | 6/1988 | Pribnow | 395/200 |
| 4,775,955 | 10/1988 | Liu | 395/425 |
| 4,794,521 | 12/1988 | Ziegler et al. | 395/425 |
| 4,965,717 | 10/1990 | Cutts, Jr. et al. | 395/425 |
| 4,984,153 | 1/1991 | Kregness et al. | 395/425 |
| 4,991,090 | 2/1991 | Emma et al. | 395/575 |
| 5,043,886 | 8/1991 | Witek et al. | 395/425 |

FOREIGN PATENT DOCUMENTS

0130593 1/1985 European Pat. Off. .

*Primary Examiner*—Glenn Gossage
*Attorney, Agent, or Firm*—Staas & Halsey

[57] ABSTRACT

A system and method for controlling a "serialization" of accesses to main storage in a tightly coupled multi-processing apparatus is disclosed. The system includes a plurality of central processing units (CPUs), a main storage unit commonly shared by the plurality of CPUs and a memory control unit operatively connected to each of the CPUs. A process for ensuring that a correct sequence of accesses to the main storage is followed is called a "serialization." When a serialization occurs subsequent to a "STORE" instruction in a particular CPU, the system for controlling a serialization notifies the occurrence of a serialization to all other CPUs before the particular CPU requests the memory control unit for the serialization. If the particular CPU is not notified of any occurrence of a serialization in the other CPUs, the particular CPU immediately executes the following "FETCH" operation without waiting for completion of the particular CPU's serialization. Even if notified of an occurrence of a serialization in the other CPUs, the particular CPU need only wait for completion of the other CPU's serialization to execute the following "FETCH". When a serialization does not occur in the particular CPU, serialization notifications by the other CPUs are disregarded.

23 Claims, 14 Drawing Sheets

SYSTEM AND METHOD FOR SERIALIZATION CONTROL OF ACCESSES TO A COMMON MAIN STORAGE

BACKGROUND OF THE INVENTION

The present invention relates to a system for performing a serialization control of main storage accesses between central processing units (CPUs) in an information processing apparatus in which the main storage is shared by a plurality of CPUs.

A plurality of fetch or store accesses from a CPU to a main storage apparatus are generally conducted in parallel. It is necessary to ensure that these accesses are conducted in accordance with a predetermined order of instructions and that an instruction is executed in accordance with a predetermined set of operands in a predetermined order.

In particular, if a cache memory is employed, a STORE is conducted through a main storage and is thus slow, but a FETCH is conducted only through a cache and is thus fast, as shown in FIGS. 1A and 1B. As shown in FIG. 1A, an instruction I comprises an operand (OP) code and address portions, such as a first operand register number R1, a second operand index register number X2, a second operand base register number B2 and a second operand displacement D2. A STORE is conducted as follows. In a pipeline operation MA for a main storage access, an operand code of an instruction I is decoded in a D-cycle and the instruction I is used for accessing a general purpose register GPR. A signal of the address portion R1 is transmitted to a register R and to the next register R in the next cycle and so on. In an A-cycle, the contents of GPR are added to the displacement D2 for a logic address at effective address generator EAG, thereby providing an effective address. Then, in a pipeline operation CA for a cache access, the priority for a store request by operand request valid signal OP REQ VAL is determined in an operand request priority cycle OPP. In a T-cycle, it is detected whether or not the effective address exists in a cache. A cache comprises a translation look-aside buffer TLB, a tag TAG and a local buffer storage LBS. If the effective address matches the addresses existing in TLB and TAG, a real address for accessing LBS is set in real address register RAR. On the other hand, in a B-cycle, the WRITE data is obtained from another general purpose register GPR based on the address transmitted from instruction I. In an E-cycle, the WRITE data is set in register R1. While the real address is set in register R2 in an R-cycle, the WRITE data are stored in a register in accordance with operand status signal OP STV and subsequently in another register R in a W-cycle and in LBS in an S-cycle. The WRITE data and the real address are respectively transmitted to the memory control unit (MCU) through a register R and a part by memory control unit request signal MCU REQ so that the WRITE data may be stored in the main storage after a completion of one execution cycle of one instruction. Therefore, it takes time to store the WRITE data in the main storage.

A FETCH operation is shown in FIG. 1B. In an A-cycle, an effective address is obtained based on address portions B2 and D2 of instruction I and the priority for a fetch request by a signal OP REQ VAL is determined in an OPP-cycle. It is determined in a T-cycle by referring to TLB and TAG, whether or not the effective address exists in a cache. If it does, the data is obtained from LBS in a B-cycle and transmitted to result word register RWR through operand word register OWR in accordance with a signal OP STV in an E-cycle. Moreover, the data is transmitted from RWR and stored in a general purpose register GPR after a W-cycle. It is thereby subjected to a fetch operation before a completion of an execution cycle of an instruction.

Therefore, when a FETCH instruction is produced after a STORE instruction, the actual fetch operation is completed before the STORE operation. Thus, previous data in which the result of STORE is not yet reflected are fetched by the FETCH operation. In order to fetch the new data in which the result of STORE is properly reflected, it is necessary to perform a serializing process by providing a serialization request signal.

In some information processing apparatuses a main storage apparatus is shared by a plurality of CPUs. In these apparatuses a case arises in which a plurality of stores must be conducted by a CPU and be observed in accordance with an execution order from the CPUs when respective CPUs perform processes using a common area in the main storage apparatus.

In this case, when a certain process of several instructions or an interruption is conducted, a particular CPU must observe that another CPU completes its store access to the main storage apparatus before its following fetch access to the main storage apparatus. The process for ensuring that this sequence is followed is called serialization.

The serialization process is conducted as follows:

1. A first operation is conducted during the period from when a particular CPU transmits the serialization request after a store pending signal becomes 0 to when the MCU receives the serialization completion signal. This is the period during which the following fetch operation is stopped.

2. A second operation is conducted during the period from when the MCU receives the serialization request to when it completes distributing the serialization request to CPUs except for the particular CPU.

3. A third operation is conducted during the period to when an invalidation of a cache is completed by a store previously executed by the CPU from when the other CPUs receive the serialization request. This is the period during which following accesses to the main storage are stopped.

The CPUs' parallel processing ability should be increased so that the serializing process in a main storage access in a plurality of CPUs is executed at high speed.

FIG. 1C shows a structure of an information processing apparatus of a type to which the present invention is directed.

In FIG. 1C, N+1CPU 1-0, 1-1 . . . and 1-N (N is an integer larger than 1) operate in parallel. Memory control apparatus (MCU) 2 processes access requests of respective CPUs and main storage unit (MSU) 3 is shared by respective CPUs. Caches 4-0 to 4-N, comprising a high-speed small-capacity buffer, are provided at respective CPUs and constitute a hierarchical memory architecture together with main storage unit MSU. Instruction control units 5-0 to 5-N are provided for the respective CPUs and perform an execution instruction control using a pipeline.

A store-in function and a store-through function exist for controlling these caches. Store-in means that STORE is reflected only on a cache upon an execution of a store, and a group of data to be stored is transmitted to main storage unit MSU when the serialization is conducted or when the STORE of the particular CPU is reflected on all caches in other CPUs. Store-through is a method for always transmitting data to the main storage unit MSU every time STORE is performed.

The serialization process differs greatly depending on whether the cache control method is a store-in or a store-through. Examples of both cases are described as follows.

For a store-in, the store in which the control is classified depends on whether the area is private or public. In a public area, the contents of the cache are transmitted to the main storage unit MSU upon serialization. When the caching operation is invalidated, the next access to the main storage is performed so that the most recent data are obtained from the main memory unit, thereby ensuring that the serialization operation is executed.

For a store-through, a group of data to be stored of respective CPUs is generally transmitted to the main storage unit MSU, and the data in the other CPU caches are invalidated if the data of the store area are maintained in caches of other CPUs. This process including data transmission and cache invalidation is expressed by words reflection process in the following paragraphs. For a CPU which performs the serialization, the following access to a main storage is delayed until the reflection process on other CPUs is completed. Two serialization methods are available based on the time relationship between a main storage access of the operation accompanied with the serialization and a main storage access of the serialization object.

The first is a pre-serialization method. This method ensures that a main storage access in an operation accompanied with a serialization is conducted after a main storage access preceding the operation is completed. The other is a post-serialization method. This method ensures that a main storage access which follows the operation accompanied with a serialization is conducted after the operation is completed.

FIG. 2 shows a timing chart of a pre-serialization according to a prior information processing apparatus in FIG. 1C. FIG. 3 shows a timing chart of a post-serialization according to the prior apparatus. The prior art pre-serialization in FIG. 2 is explained as follows.

1) shows an execution flow in pipeline operations, a main storage access pipeline MA and a cache access pipeline CA of an instruction accompanied with a serialization. D represents an instruction decode cycle, A represents a generation cycle of an effective address for an operand, T represents a cycle of an address translation conducted by accesses to TLB and TAG and a detection of the existence of data in the buffer by an access to TAG. B represents a buffer 0 (cache) access cycle, E represents an execution cycle, and W shows a writing cycle of the result. OPP represents an operand request priority cycle conducted by an operand request valid signal OP REQ VAL and R represents a reading cycle conducted by an operand status valid signal OP STV.

2) is a store pending signal transmitted to a CPU when the memory control unit (MCU) is processing the storing request preceding the instruction to be serialized. The store pending signal is on until a STORE operation is entered into a pipeline operation of the MCU after an A-cycle starts, as shown in FIGS. 1A and 2.

3) is a serialization request signal, transmitted after a store pending signal is turned off, for the CPU performing a serialization to conduct a serialization request.

4) is a period of serialization processing in which the MCU informs other CPUs of a serialization request and the result of the preceding store of the CPU is reflected on the caches in other CPUs (i.e. the caches are invalidated). Other CPUs stop access to the main storage in this period.

5) shows a serialization completion signal transmitted from the MCU to the CPU performing the serialization after the serialization process 4) is completed. The CPU completes the serialization process when it receives this signal.

6) is an interlock period, in which the instruction execution of 1) is delayed by the serialization operation. The fetch operation of the operand using the address generated during the A-cycle is kept waiting for this interlock, and is carried out through the cache LBS during B-cycle when the interlock is released upon completion of the serialization.

Next, a prior art post-serialization method is explained by referring to FIG. 3.

1)' shows an execution flow in pipelines MA and CA of an instruction having a store request in the CPU S represents a store cycle for storing data in a cache followed by a memory control unit request signal MCU REQ.

2)' is a store pending signal transmitted to the CPU by an execution of a preceding store request. The store operation has not been invoked in a MCU pipeline and is not guaranteed to be transacted in the order of other requests from the CPU.

3)' is a post-serialization trigger signal produced in the CPU in a B-cycle. This signal is turned on in order to perform the serialization process independently from the flow requesting the serialization process.

4)' is a serialization request signal transmitted from CPU to MCU as a result of 3)', when the store pending signal of 2)' is turned off.

5)' is a period of serialization processing in which, after the CPU transmits a serialization request signal 4)' to the MCU, the MCU informs other CPUs of this signal. The result of the store from the present CPU is reflected on caches in other CPUs (i.e. the caches of other CPUs are invalidated). In this period, other CPUs stop performing a main storage access, from when the serialization signal is received to when the request for invalidating the cache, which is received previously, is completed.

6)' is a serialization completion signal transmitted from the MCU to the CPU performing the serialization, when a reflection process on the caches of other CPUs is completed. The serialization completion signal is turned on when the serialization request signal received by all the CPUs in a system, namely, when it is guaranteed that, after the request for invalidating the caches due to the previous store is completed in all CPUs other except for the particular CPU, the following memory access is executed by respective CPUs.

7)' is an execution instruction sequence to be executed after a store instruction ST of 1)'. A fetch conducted using an address generated at the A-cycle of 7)' is interlocked by generation of post-serialization trigger 3)' and is kept waiting until a completion of the serializing process of 5)'.

8)' is an interlock period of 7)'.

An operation of the prior art shown in FIGS. 2 and 3 is explained by referring to the structure shown in FIG. 1C.

Any one of instruction control units 5-0 to 5-N of respective CPUs 1-0 to 1-N may perform a store operation accompanied by an instruction execution. The serialization request signal is transmitted to the memory control unit MCU after reaching a cycle in which an interface between the corresponding caches 4-0 to 4-N and the memory control unit MCU is not affected, that is, in which the store pending signal is turned off. Thereafter, the main storage access is stopped until the serialization request signal reaches other CPUs.

The MCU processes sequentially such serialization request signals in order of receipt, in a similar manner to the store request, and thereafter transmits the serialization request signal to the other CPUs. As a result the other CPUs stop their main storage accesses until the previously received cache invalidation request is completed.

Namely, when the serialization request signal transmitted after the store pending signal is turned off reaches the other CPUs from the MCU, serialization is ensured so that the previously conducted store is reflected in all the caches of the other CPUs. In an information processing apparatus having a plurality of CPUs with individual caches and a common main storage apparatus, there is a problem that a main storage access following the serialization process is kept waiting, without any condition, until the store reflection process or cache invalidation process at the time of the serialization is completed, regardless of whether the cache is controlled by store-in or store-through method. Thus, the parallel processing capability of a plurality of CPUs is decreased.

SUMMARY OF THE INVENTION

An object of the present invention is to make a main storage access start as quickly as possible after a serialization process and to increase the parallel processing capability of a plurality of CPUs.

The present invention is based on the observation that serialization between a plurality of CPUs having a common main storage apparatus is meaningful when the order of the main storage access can be observed mutually by respective CPUs. Namely, serialization processing of a particular CPU can be observed by other CPUs only when the main storage access is performed for an area associated with main storage accesses the sequence of which is guaranteed. Therefore, the case where it is necessary to keep the main storage access waiting until after the serialization process is completed is distinguished from the case where it is not. When it is not necessary to cause the main storage access to be delayed, the following main storage access is executed immediately. In particular, upon storing, when a particular CPU transmits a serialization notification to all other CPUs and does not receive a prior serialization notification from the other CPUs, a main memory access is instantly executed. When the particular CPU transmits the serialization notification to all other CPUs and receives a prior serialization notification from other CPUs, the main memory access is kept waiting.

DESCRIPTION OF THE PREFERRED EMBODIMENT

Figure 1A:
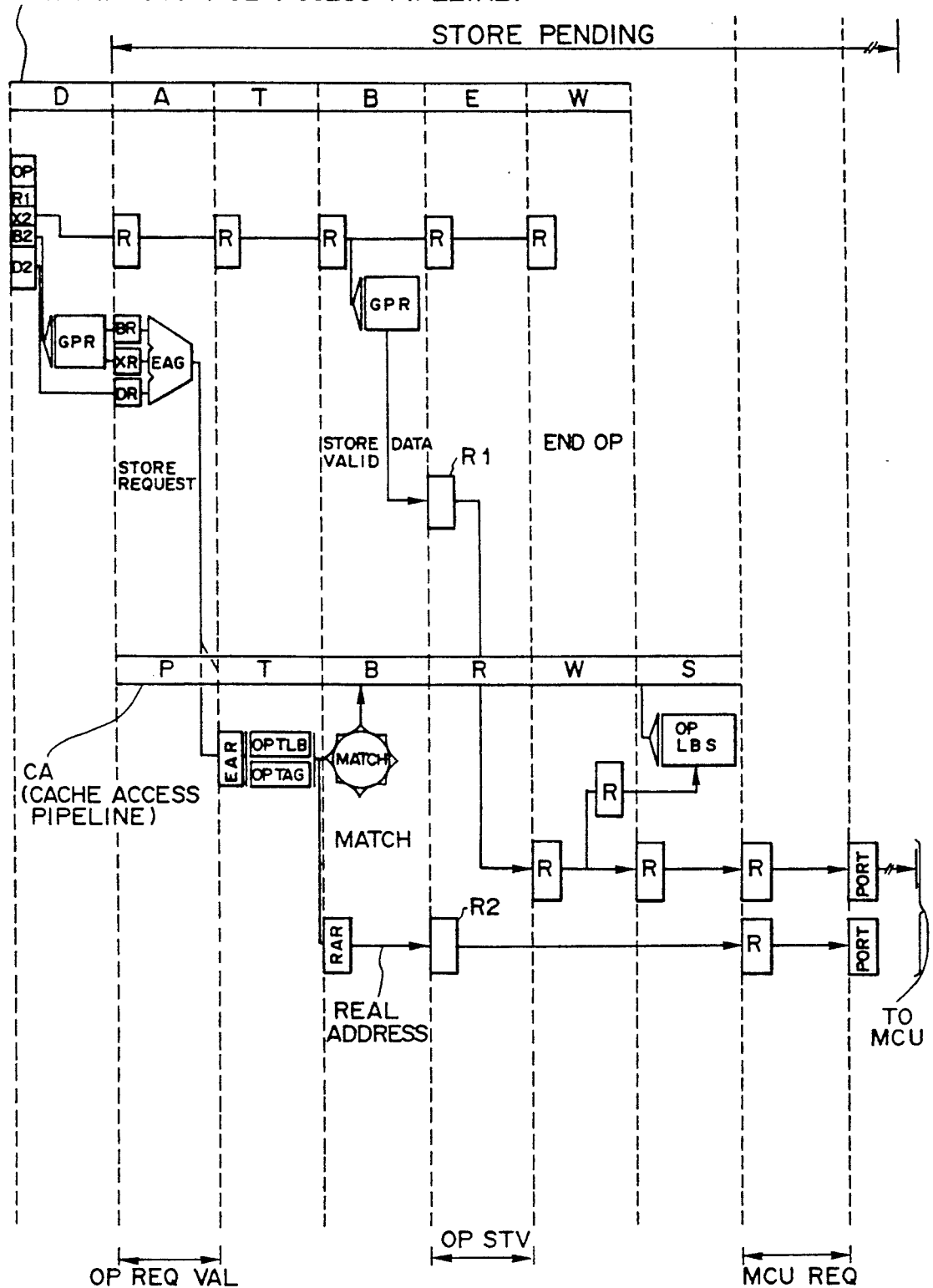
FIGS. 1A and 1B show a STORE operation flow and a FETCH operation flow respectively in an information processing apparatus.
Figure 1B:
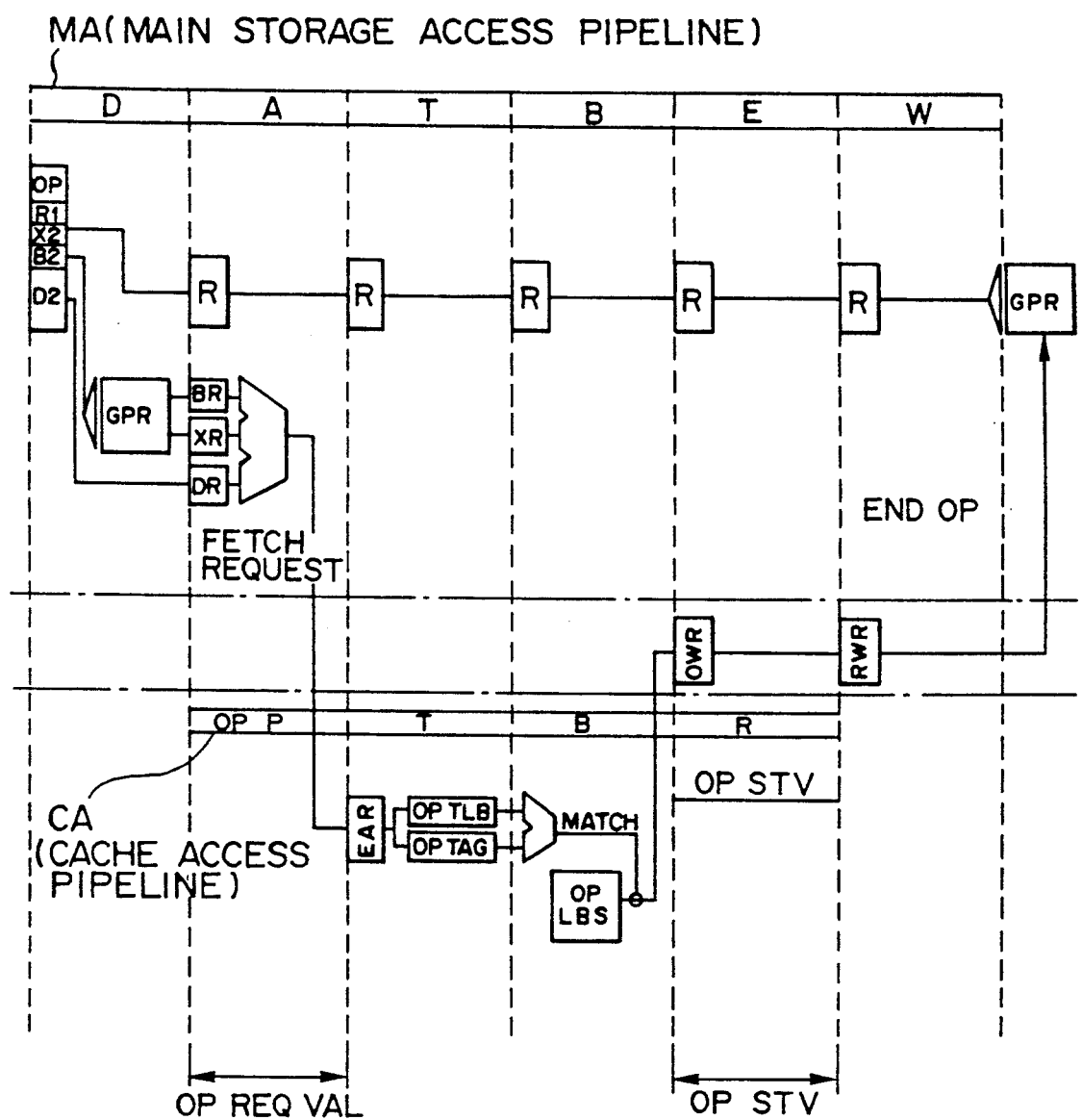
Figure 1C:
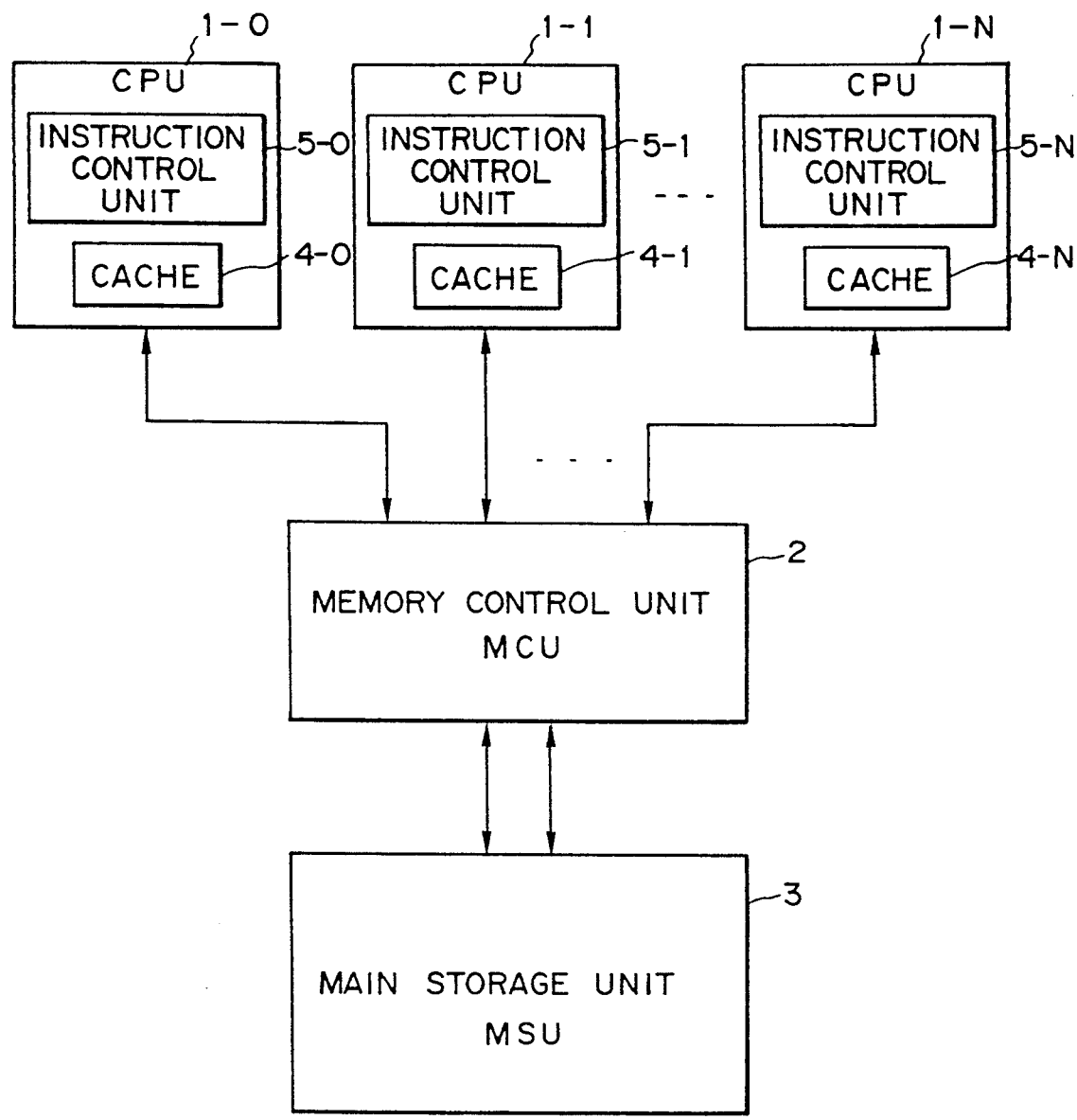
FIG. 1C shows a structural view of the information processing apparatus in which the CPUs share the main storage apparatus.

The present invention will be explained by referring to a concrete example, in which the information processing apparatus comprises two CPUs, CPU-0 and CPU-1. A sequence of operation is as follows:

a) CPU-0 stores (ST) data in areas A and B and CPU-1 subsequently fetches (Fch) data sequentially from areas B and A. In this case the instruction sequence is presented as follows.

| (CPU-0) | (CPU-1) |
| --- | --- |
| ST A | |
| ST B | |
| | Fch B |
| | Fch A |

If the result of the store by CPU-0 is observed by CPU-1 when CPU-1 fetches area B (namely, the result of the store by CPU-0 has been reflected on the result fetched by CPU-1), the result of the previous store by CPU-0 should be observed when CPU-1 fetches area A. This is based on an assurance of the order of stores conducted by CPU-0.

b) When CPU-0 stores data in area A (ST), serialization (Serialize) is conducted and thereafter CPU-0 fetches (Fch) area B. Then, CPU-1 stores (ST) data in area B and the serialization (Serialize) is conducted, and CPU-1 fetches (Fch) data from area A. In this case, the instruction sequence is shown as follows.

| (CPU-0) | (CPU-1) |
| --- | --- |
| ST A | |
| Serialize | |
| Fch B | |
| | ST B |

| (CPU-0) | (CPU-1) |
|---|---|
| | Serialize |
| | Fch A |

The result stored in area B by CPU-1 is not reflected on the result fetched from area B (Fch B) by CPU-0. Namely, when a fetch of B by CPU-0 precedes the next store of B by CPU-1, STORE in area A (ST A) of CPU-0 is completed before FETCH B and thus, STORE A by CPU-0 (ST A) is executed before STORE B by CPU-1 (ST B), and is always before FETCH A (Fch A) by CPU-1.

Therefore, the result stored in area A by CPU-0 (ST A) must be reflected on a result fetched from area A (Fch A) by CPU-1. This is based on assurances of the order of a store and a fetch by the serialization processes (Serialize) of CPU-0 and CPU-1. On the other hand, if CPU-1 does not perform a serialization, it is not guaranteed that STORE in area B is executed prior to FETCH from area A, and, thus, even if the result stored in area B by CPU-1 is not reflected on the result fetched from area B by CPU-0, it is not always true that the result of STORE A by CPU-0 is always observed (or reflected) on FETCH A by CPU-1.

Between these two examples, the order assurance between ST A operation by CPU-0 and Fch A operation by case a) can be easily realized by sequentially performing a store process to the main storage unit upon STORE by the CPU, and sequentially performing a serialization process to invalidate the cache of another CPU which has the same data storing area. Even if the data of area A exist in a cache in CPU-1, the result of STORE A by CPU-0 is reflected on the cache by processing a cache invalidation request caused by STORE A operation. The delay of the main storage access after the serialization process caused by the above process is produced based on the time period required to transmit the data from the main storage unit to the cache memory when an access is made to the invalidated area in the cache.

However, to ensure the sequence of CPUs in the above example b), it is necessary to delay a fetch after a serialization process until the store before the serialization process is reflected on the main storage unit and the corresponding areas of the caches of other CPUs are invalidated, therefore ensured special control is required.

In example b), the sequence of both CPUs must be ensured only when both CPUs perform a serialization process and the execution sequence of both CPUs which is to be ensured is a sequence of a store and a fetch, being interposed a serialization between the store and the fetch, in a particular CPU observed by another CPU. The execution sequence between the two CPUs is not restricted.

When CPU-1 can recognize that CPU-0 performs a serialization operation, before CPU-1 performs the serialization operation it is pointless to keep a fetch (Fch B) waiting after the serialization operation in CPU-0 until the store (ST A) performed before the serialization operation is reflected on caches in CPU-1. CPU-1 only needs to await that the store (ST A) conducted before CPU-0 performs a serialization operation is reflected in the result of the fetch (Fch A) after the serialization of CPU-1.

In the present invention, when serialization is performed by a particular CPU, other CPUs are notified of the serialization by the particular CPU before a serialization request is transmitted. Further, only when serialization notification from the other CPUs is received before the serialization notification by the particular CPU reaches the other CPUs, the main storage access following the serialization is delayed until the result of the store conducted before the serialization of the CPU which notifies the serialization is reflected on caches in the particular CPU. When a serialization notification from other CPUs is not received, however, the following main storage access is performed immediately after the serialization notification by the particular CPU reaches the other CPUs.

Figure 4:
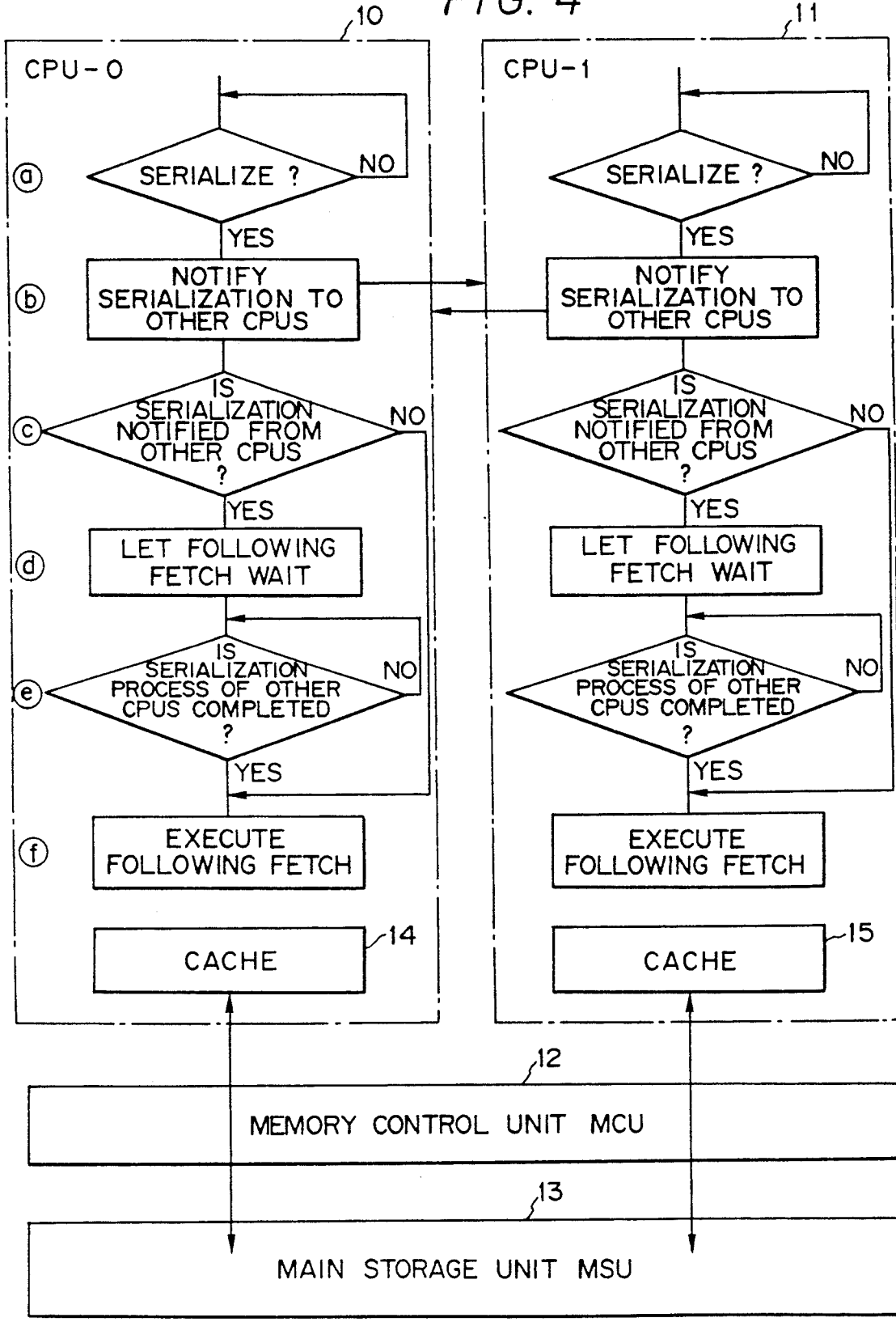
FIG. 4 shows a principal structure of the present invention.

FIG. 4 explains the principle of the present invention.

As shown, an aspect of the present invention comprises CPU-0 10, CPU-1 11, memory control unit (MCU) 12, main storage unit (MSU) 13 and caches 14 and 15 provided within CPU-0 and CPU-1. A method of the serialization control according to the present invention is shown as a flowchart within respective blocks of CPU-0 and CPU-1.

For simplification, only two CPUs are shown in FIG. 4, but more CPUs can be used. In this case, it is assumed that respective CPUs have the same functions regarding sequential control. The method of the serialization control of respective CPUs is explained by referring to steps A to F of the flowchart shown in FIG. 4.

a) Respective CPUs execute respective instruction sequences and detect the condition that serialization is requested.

b) When serialization requests are detected in step a), serialization is notified to other CPUs.

c) After step b), it is determined whether or not notification of serialization from other CPUs exists, and d) or f) is next executed based on the result of this determination when notification exists and does not exist, respectively.

d) If serialization from the other CPU is detected in step c), execution of the following fetch subjected to the serialization in the particular CPU is made to wait.

e) This step is kept waiting until the result of a store conducted by the other CPU of the transmission source of the serialization notification detected by c) is reflected on the cache of the particular CPU, i.e., the invalidation of the cache is completed when the serialization process is completed.

f) When serialization notification from another CPU is not found in step c), or a completion of the serialization process is detected in step e), the following fetch of the serialization is executed.

Operation of the serialization control method according to the present invention will be explained by referring to the example.

Figure 5:
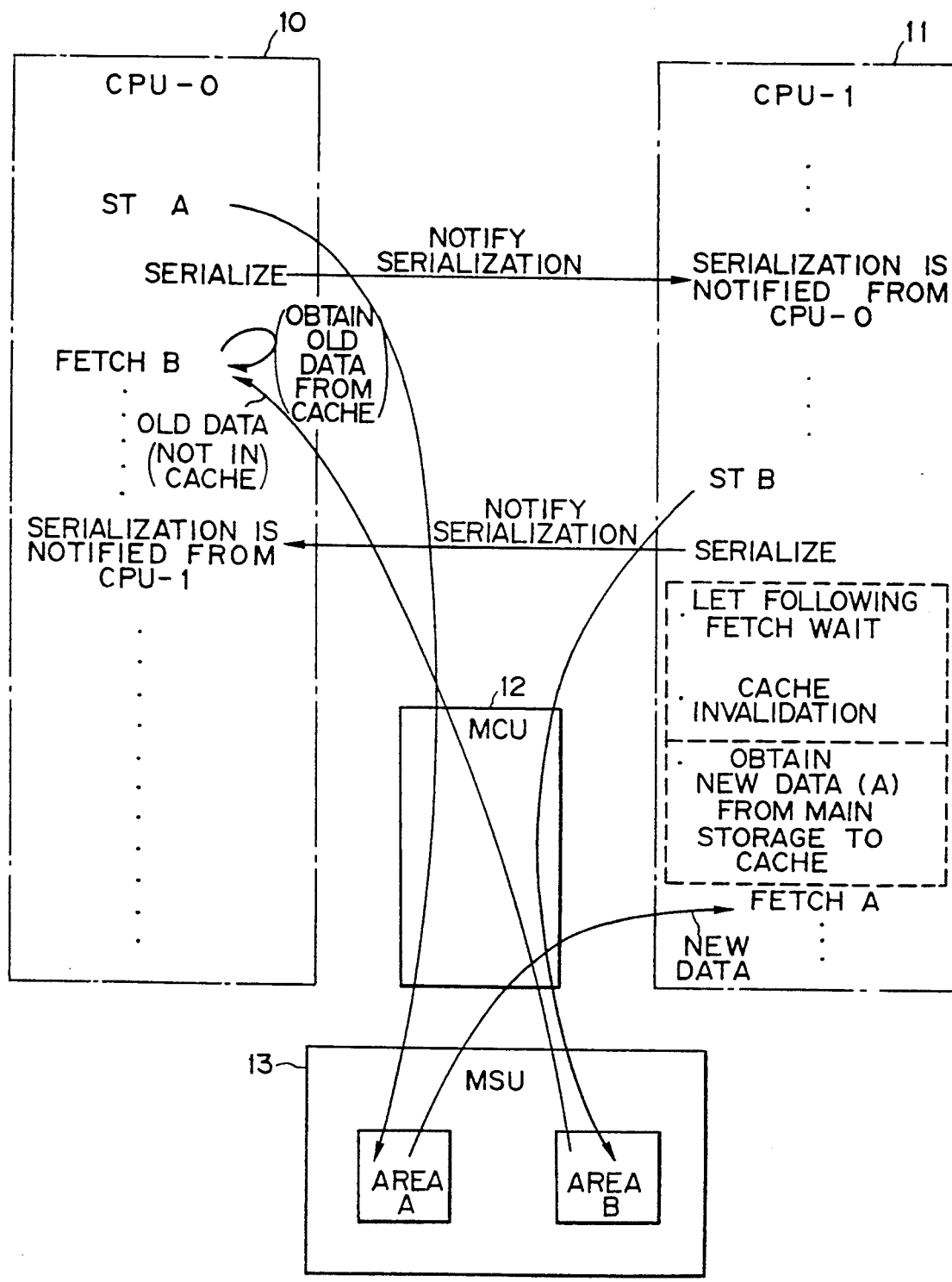
FIG. 5 shows an explanatory drawing of the serialization control operation according to the present invention.

FIG. 5 explains the serialization control operation when CPU-0 and CPU-1 execute an instruction sequence including serialization.

At first, CPU-0 transmits a store request (ST A) to the area A and sequentially initiates the serialization (Serialize).

In the serialization control, the serialization notification from CPU-0 is transmitted to CPU-1 and CPU-1 confirms it as serialization notification from CPU-0. Then, as CPU-0 does not receive serialization notification from CPU-1, the fetch (Fch B) from area B is executed without waiting for the completion of the store request (ST A) in area A. The fetch is instantaneously conducted from the cache when data exists in it.

On the other hand, CPU-1 receives the serialization notification from CPU-0. Thereafter, CPU-1 transmits a store request (ST B) in area B and then activates the serialization. In the serialization control, serialization notification is transmitted to CPU-0 and CPU-1 recognizes the serialization notification previously received from CPU-0. The following fetch (Fch A) from area A is interlocked and execution of the fetch is made to wait.

CPU-1 waits for a completion of cache invalidation based on the store request (ST A) of CPU-0 and when this invalidation is completed, the new data of area A are sent to the cache from main storage unit (MSU) and fetch request (Fch A) is executed.

As described above, respective CPUs notify the serialization to other CPUs when serialization has been conducted. Thus, the CPU which performs the serialization controls whether or not the following fetch should be kept waiting, based on the existence or non-existence of a serialization notification from other CPUs.

In contrast, in the prior art, FETCH B by CPU-0 is always kept waiting until the invalidation of the cache in CPU-1 required by STORE A upon the serialization by CPU-0 is completed.

An embodiment of the present invention will be explained hereinafter.

Figure 6:
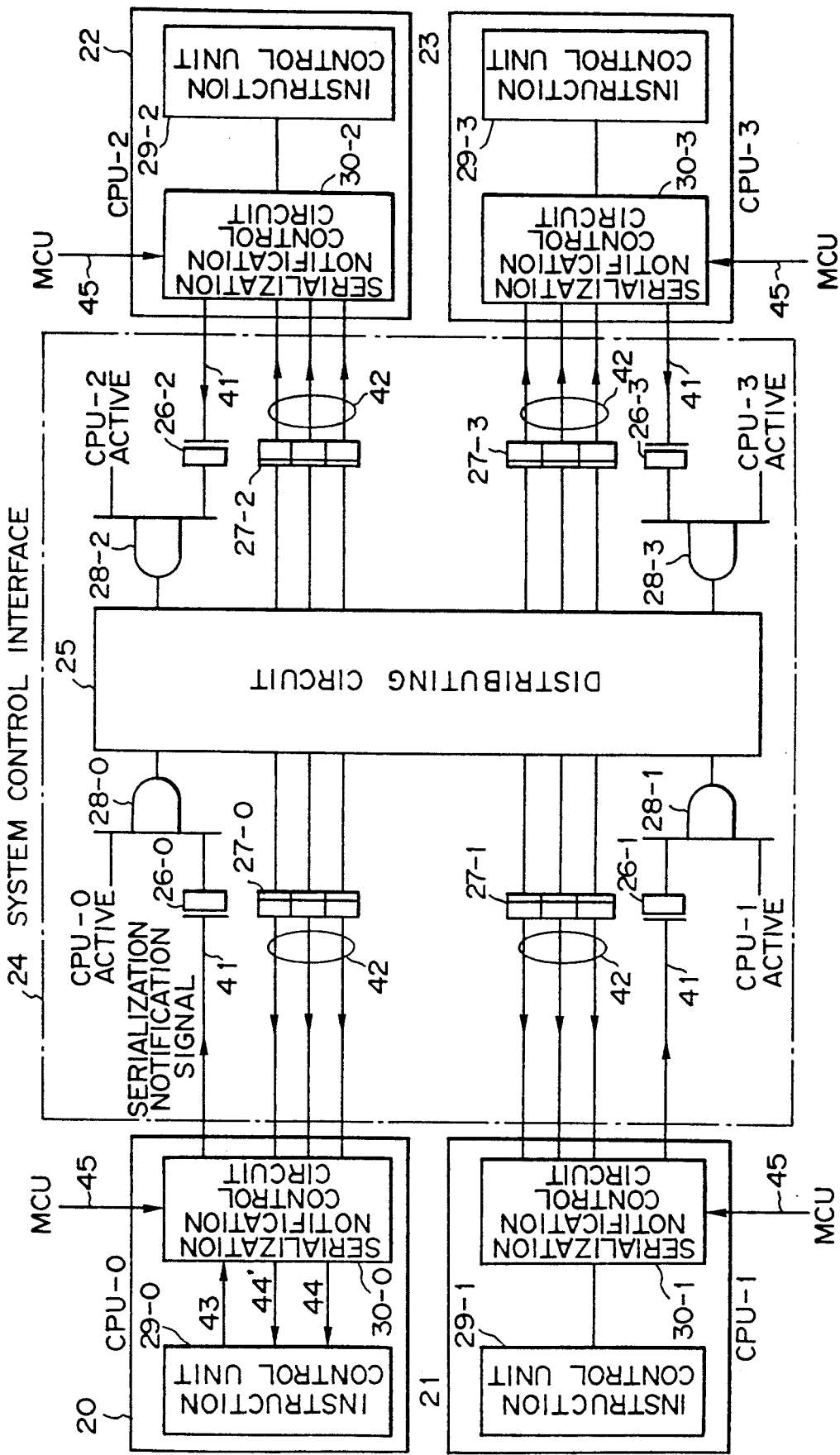
FIG. 6 shows the structure of the system control interface according to an embodiment of the present invention.

FIG. 6 shows a structure of a system control interface for exchanging serialization notification between CPUs. This structure comprises CPU-0 20, CPU-1 21, CPU-2 22, CPU-3 23, system control interface 24, a distributing circuit 25 for distributing the serialization notification signals transmitted from one CPU to other CPUs, input ports 26-0 to 26-3 for receiving the serialization notification signal transmitted from CPU-0 to CPU-3, respectively, output ports 27-0 to 27-3 for outputting the serialization notification signal transmitted from the remaining three CPUs including CPU-0 to CPU-3, AND circuits 28-0 to 28-3 which transmit an input signal to respective input ports 26-0 to 26-3 to distributing circuit 25 only when their other input CPU-0 ACTIVE to CPU-3 ACTIVE, respectively, is a logic '1', instruction control units 29-0 to 29-3 and serialization notification control circuits 30-0 to 30-3.

When instruction control units 29-0 to 29-3 in respective CPUs 20 to 23 recognize a necessity for serialization based on the instruction or interruption, serialization notification control circuits 30-0 to 30-3 turn the serialization notification signal ON. In particular, when the serialization notification signal is turned on after execution of the store, the following fetch is executed instantaneously if the CPU has not previously received a serialization notification signal from the other CPUs and the fetch is made waiting if the CPU receives the serialization notification signal from other CPUs. During a period determined by serialization notification counter 33 (shown in FIG. 7), the serialization notification control circuit examine whether the serialization notification is receive from other CPUs and the instruction control unit makes the fetch waiting. If the serialization notification signal is received from a CPU in this period, it is held, thereby delaying the fetch until the serialization notification signal from the CPU falls.

Serialization notification signals from respective CPUs are inputted to input ports 26-0 to 26-3 of system control interface 24, then inputted to distribution circuit 25 through AND circuits 28-0 to 28-3 and finally distributed to other CPUs through output ports 27-0 to 27-3.

Figure 7:
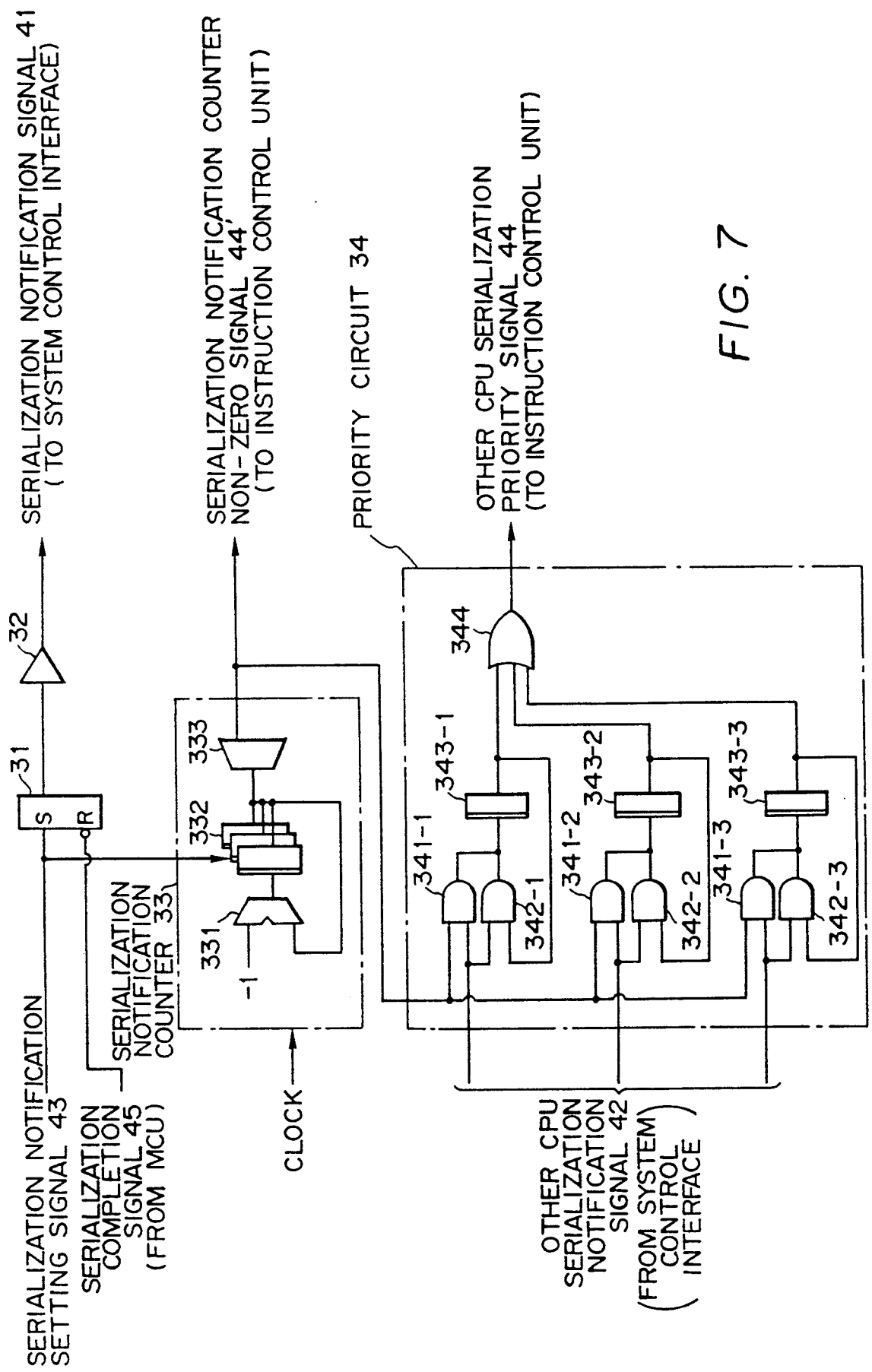
FIG. 7 shows the detailed structure of the serialization notification control signal circuit of the embodiment in FIG. 6.

FIG. 7 shows in detail the structure of the serialization notification control circuit provided within respective CPUs in FIG. 6.

The serialization notification control circuit comprises latch 31 for setting the serialization notification signal transmitted from the CPU, buffer gate 32, serialization notification counter 33 for providing a timing suitable for a delay period corresponding to the transmission of the serialization notification signal to other CPUs through system control interface 24 of FIG. 6, and priority circuit 34 for detecting the earlier of transmission of the serialization notification signal from the particular CPU or arrival of the serialization notification signal from other CPUs. The output of priority circuit 34 is transmitted to the instruction control unit of the particular CPU which makes the following fetch wait, thereby providing a waiting signal.

Latch 31 is set by serialization notification setting signal 43 from the instruction control unit 29-0 of FIG. 6, and is reset by serialization completion signal 45 from the MCU. Serialization notification signal 41 outputted from latch 31 is transmitted to system control interface 24 of FIG. 6 through buffer gate 32 so that it is distributed to other CPUs.

Serialization notification counter 33, which operates as a delay circuit, comprises subtracter 331 receiving a −1 signal at every input clock, registers 332 connected to the subtracter 331 and decoder 333 connected to the registers 332 for outputting a serialization notification counter non-zero signal of the counter 33. The decoder 333 operates an OR circuit and sets an initial value by using serialization notification setting signal 43. The initial value of the counter 33 corresponds to a propagation time from a particular CPU to other CPUs. Thereafter the subtraction count is conducted in accordance with a clock. The serialization notification counter non-zero signal 44' is ON until serialization notification 33 reaches "0", when it is turned OFF. Serialization notification counter non-zero signal 44' is transmitted to the instruction control unit 29-0 of the particular CPU to perform an interlocking control, and provides priority circuit 34 with a checking time of the serialization notification signals from other CPUs.

Priority circuit 34 comprises a first AND gate 341-1 having an input connected to the output of serialization notification counter 33 and another input connected to system control interface 24 to receive the serialization notification signal from other CPU, for example, CPU 1 and a second AND gate 342-1 having an input connected to the input of the first AND gate connected to system control interface 24. It also includes flip-flop 343-1 having an input connected to the output of first and second AND gates 341-1 and 342-1 and an output connected to another input of second AND gate 342-1 and also connected to OR gate 344. AND gates 341-2 and 342-2, flip-flop 343-2, AND gates 341-3 and 342-3 and flip-flop 343-3 are similarly connected.

Priority circuit 34 receives other CPU serialization notification signal 42 and the output of serialization counter 33, and outputs other serialization priority signal 44 to the instruction control unit of the particular CPU-0, for example.

Instruction control unit 29-0 of CPU-0 applies serialization notification signal 43 to latch 31 to provide the serialization notification signal 41 to system control interface 24, and also applies it to serialization notification counter 33. The serialization counter 33 outputs the serialization notification counter non-zero signal 44' to lock the particular CPU-0 and prevent from accessing the main storage unit. When the output of the counter 33 is '1', other CPU serialization notification signal 42 may be already '1'. This means that the serialization notification from other CPU-1, CPU-2, or CPU-3 are issued before the serialization notification by CPU-0. If other CPU serialization notification signal from CPU-1, for example, has been issued, AND gate 341-1 produces a "1" output and thus OR gate 344 produces a '1" output as other CPU serialization priority signal to lock CPU-0 and prevent from accessing the main storage unit. After the countdown of the counter 33 is over, thereby outputting '0' output, flip-flop 343-1 maintains '1' output even though the output of AND gate 341-1 is turned to '0'. If all of other CPU serialization notification signals become '0', then other CPU serialization priority signal 44 outputted from priority circuit 34 becomes '0', thereby releasing CPU-0 so that CPU-0 can access the main storage unit.

If the output of counter 33 becomes '0' before an arrival of the other CPU serialization notification signal, at the input of priority circuit 34, the output of AND gate 341-1 is made to '0', thereby outputting '0' signal from priority circuit 34. This means that the serialization notification by CPU-0 is earlier than the serialization notification by CPU-1, CPU-2, or CPU-3, thereby preventing a locking of CPU-0. When serialization completion signal 45 is applied to latch 31 from the MCU, the serialization notification signal 41 becomes '0'. When CPU-0 does not produce serialization setting signal 43, the output of counter 33 is kept '0'. Therefore, the output of priority circuit 34 is also kept '0' to prevent a locking of CPU-0. In this case, even if the serialization signal 42 is transmitted from other CPUs, the outputs of AND gates 341-1, 341-2, and 341-3 are kept '0', thereby allowing the other CPU serialization signal 42 to be disregarded by the CPU-0. The above operations of counter 33 and priority 34 correspond to the flowchart shown in FIG. 4 and the operational explanation shown in FIG. 5.

Figure 8:
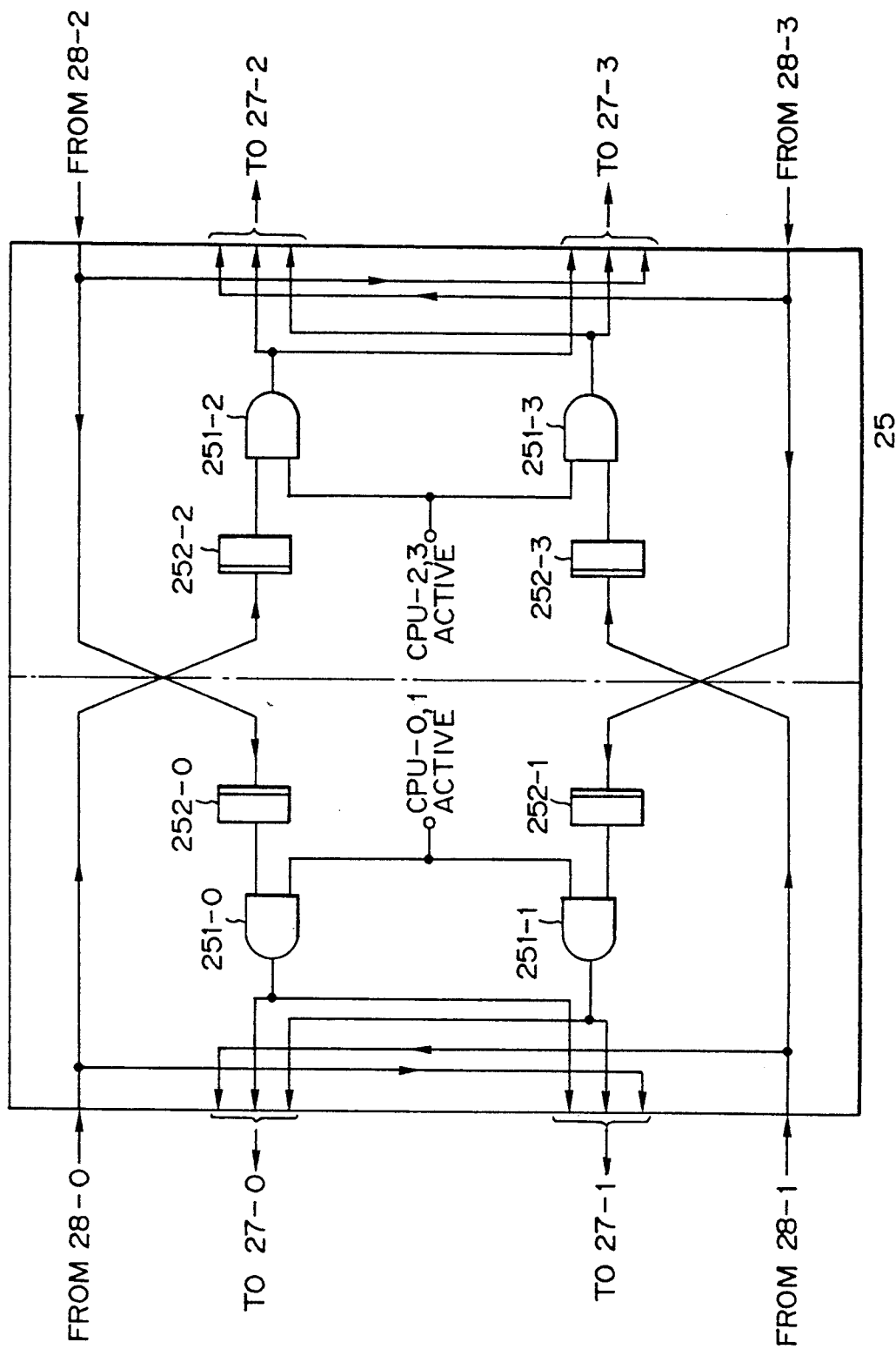
FIG. 8 shows a detailed circuit of a distribution circuit of FIG. 6.

FIG. 8 shows a detailed structure of distribution circuit 25 of FIG. 6. Distribution circuit 25 comprises four AND gates 251-0, 251-1, 251-2 and 251-3, and four flip-flops 252-0, 252-1, 252-2, and 252-3. AND gate 28-0 corresponding to CPU-0 applies signals to distribution circuit 25. A signal from AND gate 28-0 is transmitted to the register 27-2 corresponding to CPU-2 through flip-flop 252-2 and AND gate 251-2, transmitting to register 27-3 corresponding to CPU-3 through flip-flop 252-2 and AND gate 251-2, and transmitted directly to register 27-1 corresponding to CPU-1. The signal from AND gate 28-0 is accordingly distributed to CPU-2, CPU-3 and CPU-1. The same distribution is applied to the output from CPU-1, CPU-2 and CPU-3 in distributing circuit 25. CPU-0, 1 ACTIVE signal is applied to AND gates 251-0 and 251-1, while CPU-2, 3 ACTIVE signal is applied to AND gates 251-2 and 251-3.

Figure 9:
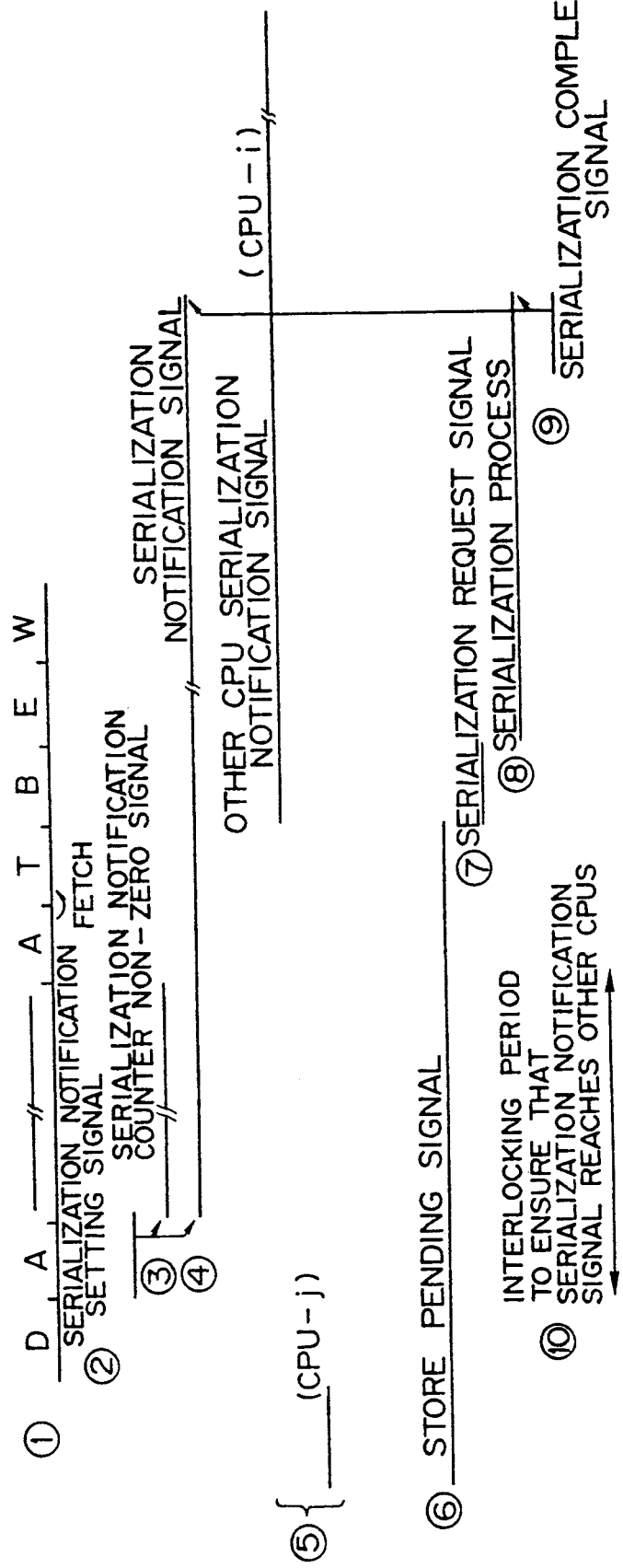
FIG. 9 shows a timing chart of an embodiment of the pre-serialized control.
Figure 10:
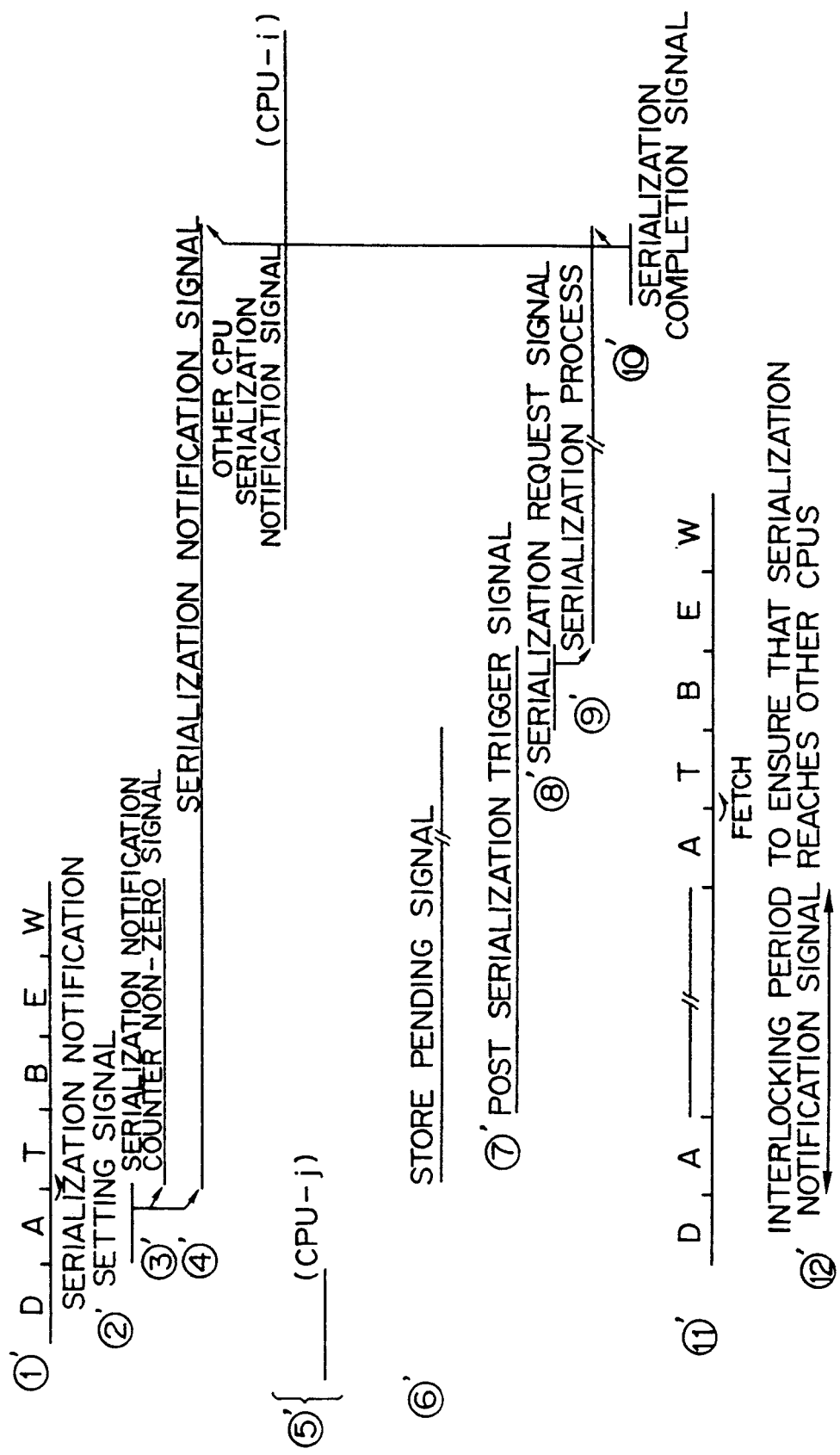
FIG. 10 is a timing chart of an embodiment of the pre-serialization control.

FIG. 9 shows an embodiment of a pre-serialization control and FIG. 10 shows an embodiment of a post-serialization control in the present invention in the form of timing charts. These timing charts correspond to the prior art timing charts shown in FIGS. 2 and 3. The basic control flow in the present invention is the same as in the prior art.

A pre-serialization process shown in FIG. 9 is explained by referring to the embodiment.

1) shows a flow of instructions for serialization of a particular CPU, in which the instruction has store access to the main storage.

2) is a serialization notification setting signal 43 produced in an A-cycle of 1). The signal 43 represents the existence of the condition that the serialization is required, thereby setting the serialization notification signal.

3) is a serialization notification counter non-zero signal 44' as an output of the serialization notification counter which is activated by the serialization notification setting signal in 2).

4) is a serialization notification signal 41 of the output of the latch.

5) is other CPU serialization notification signal 42 from other CPUs (here denoted CPU-i, CPU-j).

6) is a store pending signal.

7) is a serialization request signal transmitted from CPU to MCU.

8) is a period of serialization process for invalidating the cache, i.e., the reflection process of the result of the preceding store on other CPUs.

9) is the serialization completion signal 45 transmitted from the MCU to respective CPUs upon completion of a serialization process by the MCU, namely, when the serialization request reaches all the CPUs except for the particular CPU.

10) is an interlocking period which ensures the time for the serialization notification signal transmitted from the particular CPU to reach other CPUs, and a period for checking the serialization notification signal from other CPUs.

Next, the embodiment of the post-serialization method shown in FIG. 10 is explained.

1)' show an execution flow of an instruction which accompanies serialization.

2)' is a serialization notification setting signal 43 produced at the A-cycle of 1)' The signal 43 represents the existence of the condition that the serialization is required, thereby setting the serialization notification signal.

3)' is a serialization notification counter non-zero signal 44'.

4)' is a serialization notification signal 41 of the latch output.

5)' is other CPU serialization notification signal 42.

6)' is a store pending signal.

7)' is a post-serialization trigger signal requesting serialization with regard to the following main storage accesses.

8)' is a serialization request signal transmitted from the particular CPU to the MCU.

9)' is a period of a serialization process for reflecting the result of the store on other CPUs, namely, a period from when the MCU receives the serialization request to when the MCU completes distributing the serialization request to the CPUs except for the particular CPU.

10)' is a serialization completion signal 45 transmitted from the MCU to respective CPUs.

11)' is an execution sequence of the following instruction accompanied by a fetch in the particular CPU.

12)' is an interlocking period for ensuring that serialization notification reaches other CPUs.

The whole operation of the embodiment shown in FIGS. 6, 7 and 8 will be explained by referring to time charts shown in FIGS. 9 and 10.

As shown, the serialization notification setting signal 43 is turned ON at A-cycle of a flow of instructions to perform a serialization and then the serialization notification signal 41 is turned ON to start the serialization. The count of notification counter 33 is over when the number of cycles are counted until the serialization notification signal reaches another CPU through system control interface 24.

Until the count is over, the CPU is interlocked at A-cycle of the flow 1 in the pre-serialization method shown in FIG. 9 (normally the fetch operation is conducted in the same flow as the one accompanied with a serialization in this method), and it is interlocked at A-cycle of the flow 11)' including the following main storage access in the post-serialization method shown in FIG. 10. Thus, the main storage access request is delayed.

Before the serialization notification counter 33 counts over, namely, before the signal 44' becomes 0, priority circuit 34 examines whether or not a serialization notification signal is transmitted from other CPUs. If a serialization notification signal from other CPUs does not exist, it judges that only the particular CPU is subjected to the serialization or the particular CPU attempts to perform a prior serialization. After the serialization notification counter 33 counts over, any serialization notification signal from other CPUs is disregarded by priority circuit 34. This is because, in this case, the serialization notification signal from the particular CPU is already received by the other CPUs.

Figure 2:
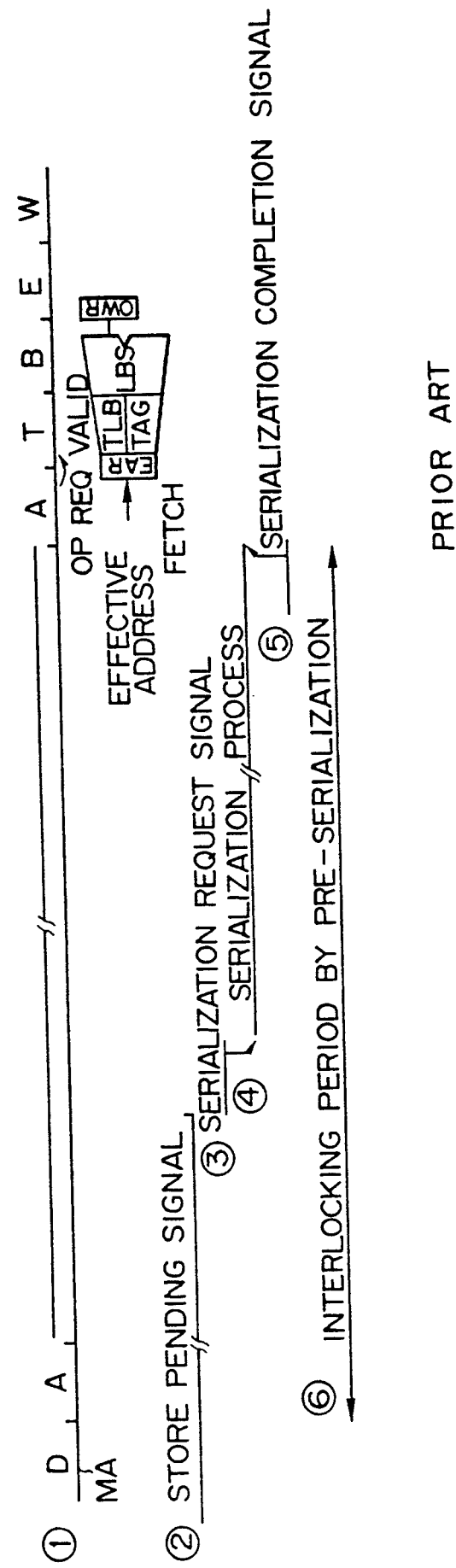
FIG. 2 shows a prior art timing chart of the pre-serialization control.
Figure 3:
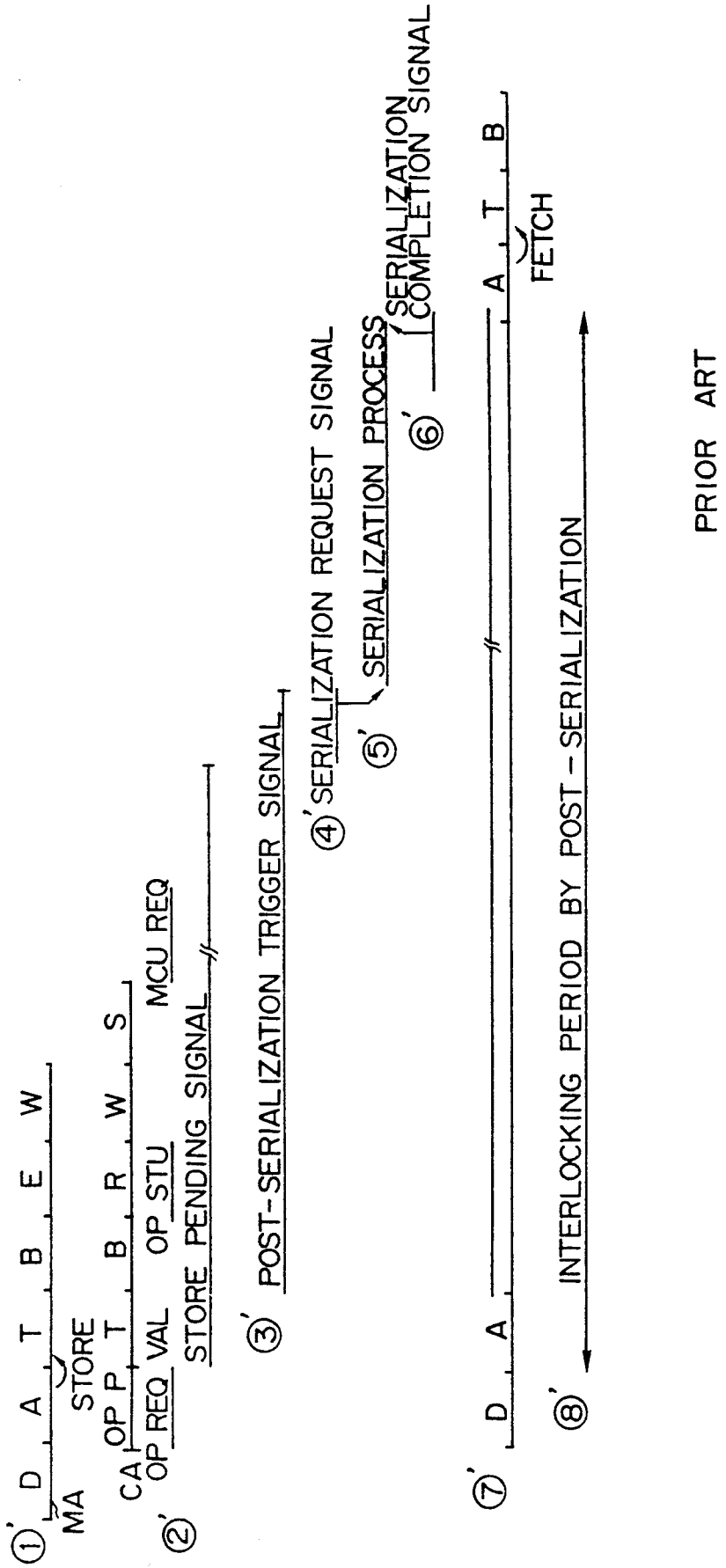
FIG. 3 shows a prior art timing chart of the post-serialization control.

When, before the serialization notification counter 33 counts over, a serialization notification signal is received from another CPU, the interlock continues at the A-cycle until the serialization notification signal from the CPU is turned OFF. This is controlled by other CPU serialization priority signal 44 outputted from priority circuit 34. Regardless of the existence of interlock at the A-cycle by serialization notification from the other CPU, the serialization request is conducted in the same sequence as in the prior art, as shown in FIGS. 2 and 3. When the resulting serialization process in completed and the serialization notification signal is turned OFF, the store prior to the serialization by the particular CPU is reflected on other CPUs. In the prior art, subsequent main storage access is kept waiting until completion of the serialization process, in which it is ensured that all the stores prior to serialization of the particular CPU are reflected on other CPUs upon serialization, namely, during a period from when other CPUs receive the serialization request to when the request for cache invalidation by the store of the particular CPU is processed. In contrast, in the present invention, the serialization notification is transmitted to the other CPUs before an actual serialization request. Therefore, it is sufficient that the interlock is applied for a short period corresponding to the transmission time.

Figure 11:
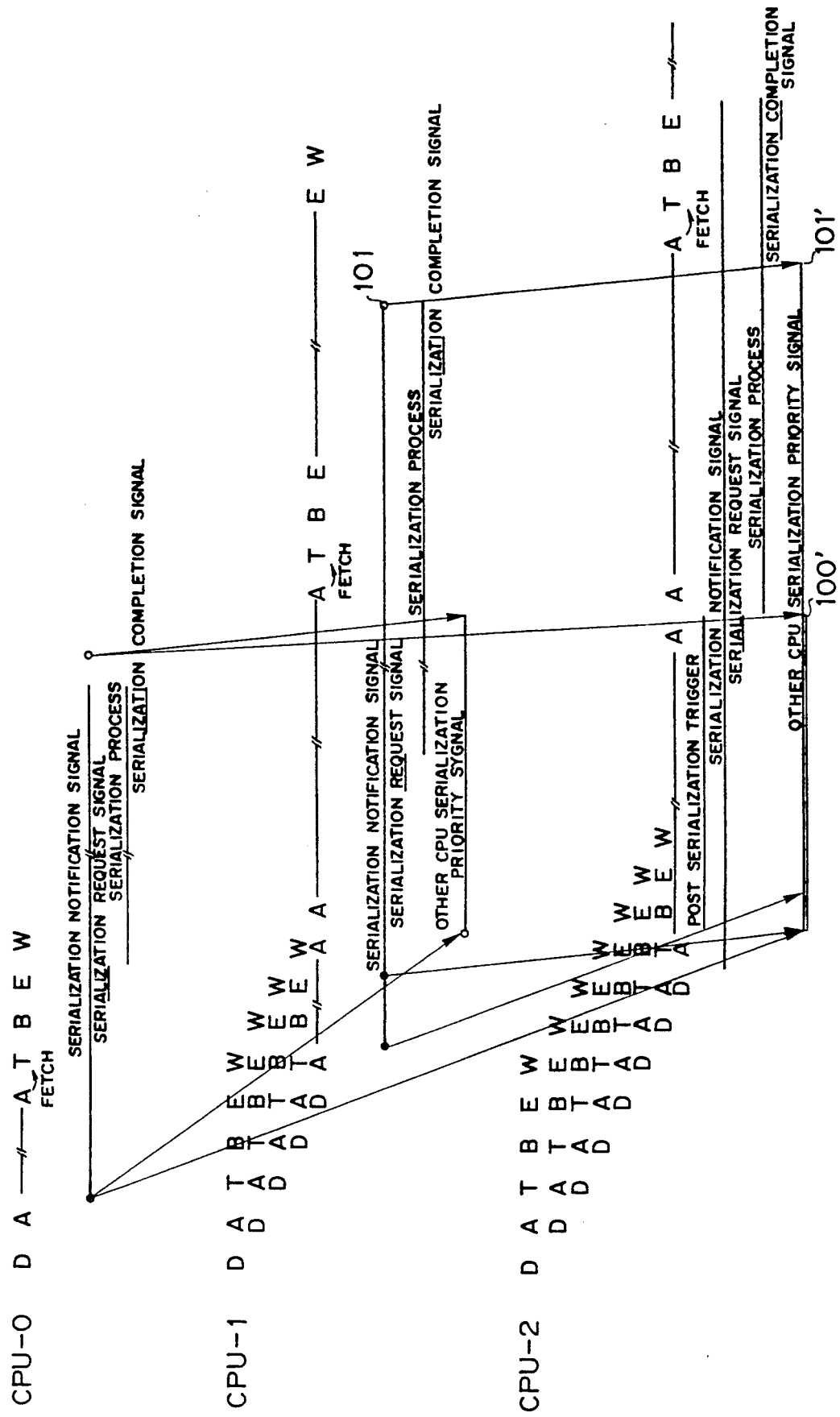
FIG. 11 shows a timing relationship of serialization notification signals produced by CPU-0, -1, and -2.

FIG. 11 shows a timing relationship of serialization notification signals transmitted by three CPUs, CPU-0, CPU-1 and CPU-2. Repeated flows of DATBEW represent normal flows processed by CPU-1 or by CPU-2 without a serialization.

As shown in FIG. 11, as to CPU-2 the serialization notification signal for performing the serialization is turned on in an A-cycle and then the post-serialization trigger signal is asserted after a delay of one cycle. Then the process enters into a store pending state as the A-cycle is extended. When the serialization request signal is outputted around the end of the post-serialization trigger, the serialization process starts. The post-serialization method executes the fetch following an operation accompanied with a serialization after the operation is completed and thus the fetch is kept waiting at the A-cycle. When the serialization notification signal is asserted, the serialization notification counter starts a countdown, during which the particular CPU is locked to prevent accessing to the main storage unit. At this time CPU-0 has already issued a serialization request, and then the serialization notification signal from CPU-0 sets a flip-flop in a priority circuit in a serialization notification control circuit of CPU-2, and the serialization notification signal from CPU-1 is also asserted earlier than the serialization notification signal from CPU-2. Therefore, another flip-flop in the priority circuit of CPU-2 produces a logic '1' signal upon receiving the serialization notification signal '1' from CPU-1. Therefore, as an output of at least one flip-flop is '1', the other CPU serialization priority signal for locking CPU-2 becomes '1'. During this period, CPU-2 cannot perform the following fetch operation. The serialization process of CPU-0 is completed at time 100; thus the serialization notification signal from CPU-0 becomes '0' in CPU-2 at time 100'. Therefore, the output of the corresponding flip-flop becomes '0'. At this time, as the serialization process of CO=PU-1 has not been completed, CPU-2 is still kept locked.

The serialization process of CPU-1 is completed at time 101. The completion of the serialization process is notified to CPU-2 at time 101'. Then, the outputs of all flip-flops become '0' thereby releasing CPU-2 from the locked state. Therefore, CPU-3 is capable of performing the fetch in the following A-cycle. The serialization requested by the serialization request signal from CPU-2 is completed when CPU-2 receives the serialization completion signal from the MCU. The fetch operation is already completed at this time.

Figure 12:
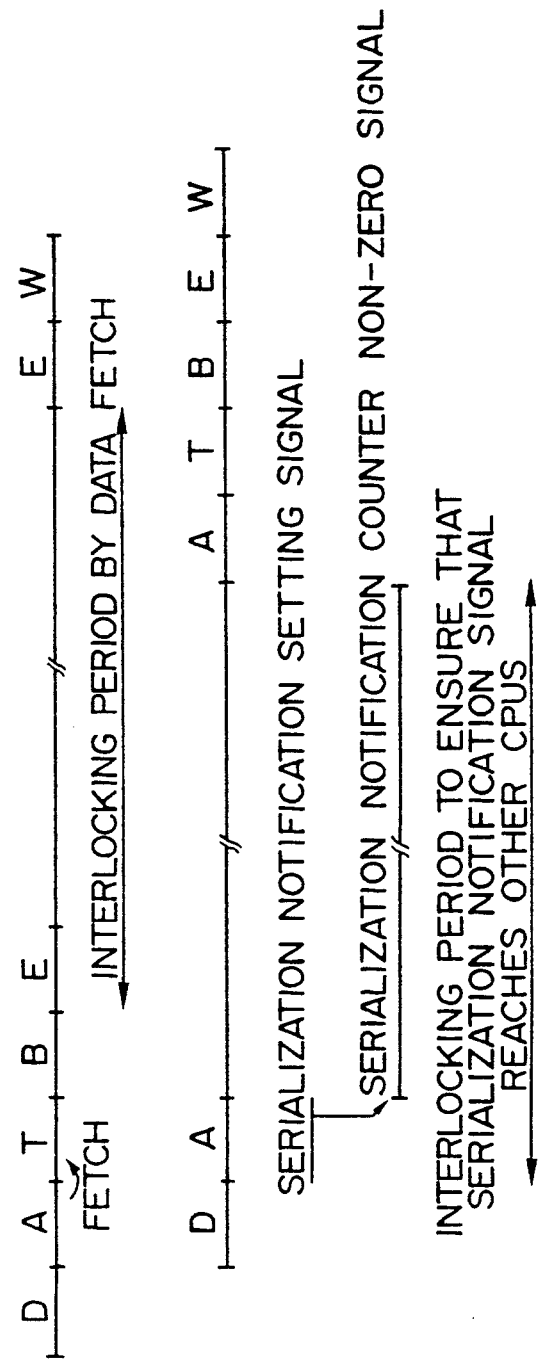
FIG. 12 shows a timing chart of the embodiment in case that the interlock accompanied by the serialization in the present invention is overlapped with the other interlock.

The interlocking period corresponding to the transmission time of the serialization notification may be fixed and is not affected by other interlocking factors. Therefore, where inevitable interlocking factors exist, the interlocking period by serialization is often not observed because such interlocking factors overlap. For example, as shown in FIG. 12, where the interlock accompanied with a fetch (FETCH) is generated in a flow of a preceding instruction, CPU is interlocked at E-cycle and this interlocking period terminates later than the termination of an interlocking period at A-cycle in a flow of a serialization. A serialization notification reaches other CPUs when the interlocking period at A-cycle terminates. Therefore, the interlock by the serialization notification does not cause any loss.

According to the present invention, when a particular CPU conducts a serialization, it is examined whether or not serialization from notifications from other CPUS are proceeding a serialization notification of the particular CPU. When they have not, the following main storage access is made possible after waiting for a time period for the particular CPU's serialization notification to reach other CPUs, thereby decreasing the waiting time accompanied with the serialization operation and greatly increasing the processing capability of the CPUs.

What is claimed is:

1. A serialization control system for controlling a main storage unit access in an information processing apparatus, said serialization control system comprising:
    a plurality of central processing units (CPUs);
    a main storage unit commonly shared by said plurality of CPUs;

a memory control unit operatively connected to each of said plurality of CPUs;

a plurality of caches of high speed and small capacity in said plurality of CPUs forming a hierarchical memory apparatus together with said main storage unit; and a control means for notifying an occurrence of a serialization in one of said plurality of CPUs to all other of said plurality of CPUs before the one CPU requests of said memory control unit for a serialization of main storage unit accesses and for allowing the one CPU to immediately perform a main storage unit access which follows the occurrence of the serialization.

2. The serialization control system according to claim 1, said serialization control system further comprising:

a memory control unit operatively connected to each of said plurality of CPUs, wherein said control means comprises a latch mean which is set by a serialization notification setting signal when a the one CPU performs a serialization and outputs a serialization notification signal to other CPUs, and is reset by a serialization completion signal from said memory control unit, a serialization notification counter for performing a count-down of a delay time in which the serialization notification signal is transmitted from the one CPU to all of the other CPUs and producing an output, and a priority circuit for receiving serialization notification signals from the other CPUs and the output of said serialization notification counter and for preventing the one CPU from accessing said main storage unit when the serialization notification signals from the other CPUs reach the one CPU before the serialization notification signal from the one CPU reaches the other CPUs and for allowing the one CPU to access said main storage unit when the serialization notification signal from the one CPU reaches at least one of the other CPUs before the serialization notification signals from the other CPUs reach the one CPU.

3. The serialization control system according to claim 2, wherein said priority circuit allows the one CPU to access said main storage unit and disregards the serialization notification signals from the other CPUs when a serialization notification signal is not generated by the one CPU.

4. The serialization control system according to claim 2, wherein said priority circuit prevents the one CPU from accessing said main storage unit when at least one of the serialization notification signals from the other CPUs reaches the one CPU during a period within which the one CPU continues to transmit a serialization notification signal after the serialization notification signal from the one CPU reaches the other CPUs until the serialization notification signals from the other CPUs become non-asserted, and allows the one CPU to access said main storage unit when the serialization notification signals from the other CPUs become non-asserted.

5. The serialization control system according to claim 2, wherein said serialization notification counter comprises a count-down means having a value set by the serialization notification setting signal of the one CPU corresponding to a time period during which the serialization notification signal from the one CPU reaches the other CPUs, and a decoder for detecting said value of said count-down means.

6. The serialization control system according to claim 2, wherein said priority circuit comprises a plurality of groups each comprising a first AND gate having a first input for receiving the output of said serialization notification counter and having a second input for receiving a respective one of the serialization notification signals from said plurality of CPUs, a second AND gate having a first input for receiving a respective one of the serialization notification signals from said CPUs, and a flip-flop having an input connected to commonly connected outputs of said first and second AND gates and having an output connected to a second input of the second AND gate; and an OR gate having a plurality of inputs, each respectively connected to the output of the flip-flop in one of said plurality of groups, for producing a serialization priority signal when the output of the flip-flop in at least one of said groups produces a logic '1' signal.

7. The serialization control system according to claim 2 including a system control interface which distributes the serialization notification signal from each CPU to all other CPUs and prevents the serialization notification signal from reaching the other CPUs when serialization control system is not active.

8. A serialization control system for controlling a main storage unit access in a tightly-coupled multiprocessor system, said serialization control system comprising:

a plurality of central processing units (CPUs);

a main storage unit commonly shared by said plurality of CPUs;

a memory control unit operatively connected to each of said plurality of CPUs;

a plurality of caches of high speed and small capacity in said plurality of CPUs forming a hierarchical memory apparatus together with said main storage unit; and a control means for notifying an occurrence of a serialization in one of said plurality of CPUs to all other of said plurality of CPUs before the one CPU requests of said memory control unit for a serialization of main storage unit accesses and for allowing the one CPU to delay a main storage unit access which follows the occurrence of the serialization only when one of the other CPUs performs a serialization prior to the one CPU.

9. The serialization control system according to claim 8, said serialization control system further comprising:

a memory control unit operatively connected to each of said plurality of CPUs, wherein said control means comprises a latch means which is set by a serialization notification setting signal when the one CPU performs a serialization and outputs a serialization notification signal to other CPUs, and is reset by a serialization completion signal from said memory control unit, a serialization notification counter for performing a count-down of a delay time in which the serialization notification signal is transmitted from the one CPU to all of the other CPUs and producing an output, and a priority circuit for receiving serialization notification signals from the other CPUs and the output of said serialization notification counter and for preventing the one CPU from accessing said main storage unit when the serialization notification signals from the other CPUs reach the one CPU before the serialization notification signal from the one CPU reaches the other CPUs and for allowing the one CPU to access said main storage unit when the serialization notification signal from the one CPU reaches at least one of the other CPUs before the serialization notification signals from the other CPUs reach the one CPU.

10. The serialization control system according to claim 9, wherein said priority circuit allows the one CPU to access said main storage unit and disregards the serialization notification signals from the other CPUs when a serialization notification signal is not generated by the one CPU.

11. The serialization control system according to claim 9, wherein said priority circuit prevents the one CPU from accessing said main storage unit when at least one of the serialization notification signals from the other CPUs reaches the one CPU during a period within which the one CPU continues to transmit a serialization notification signal after the serialization notification signal from the one CPU reaches the other CPUs until the serialization notification signals from the other CPUs become non-asserted, and allows the one CPU to access said main storage unit when the serialization notification signals from the other CPUs become non-asserted.

12. The serialization control system according to claim 9, wherein said serialization notification counter comprises a count-down means having a value set by the serialization notification setting signal of the one CPU corresponding to a time period during which the serialization notification signal from the one CPU reaches the other CPU, and a decoder for detecting said value of said count-down means.

13. The serialization control system according to claim 9, wherein said priority circuit comprises a plurality of groups each comprising a first AND gate having a first input for receiving the output of said serialization notification counter and having a second input for receiving a respective one of the serialization notification signals from said plurality of CPUs, a second AND gate having a first input for receiving a respective one of the serialization notification signals from said other CPUs, and a flip-flop having an input connected to commonly connected outputs of said first and second AND gates and having an output connected to a second input of the second AND gate; and an OR gate having a plurality of inputs, each respectively connected to the output of the flip-flop in one of said plurality of groups, for producing a serialization priority signal when the output of the flip-flop in at least one of said groups produces a logic '1' signal.

14. The serialization control system according to claim 9 including a system control interface which distributes said distributing circuit comprises a plurality of flip-flops the serialization notification signal from each CPU to all other CPUs and prevents the serialization notification signal from reaching the other CPUs when the serialization control system is not active.

15. A serialization control system for controlling a main storage unit access in a tightly-coupled multiprocessor system, said serialization control system comprising;

a plurality of central processing units (CPUs);

a main storage unit commonly shared by said plurality of CPUs;

a memory control unit operatively connected to each of said plurality of CPUs;

a plurality of caches of high speed and small capacity in said plurality of CPUs forming a hierarchical memory apparatus together with said main storage unit; and a control means for notifying an occurrence of a serialization in one of said plurality of CPUs to all other of said plurality of CPUs before the one CPU requests of said memory control unit for a serialization of main storage unit accesses and for allowing the one CPU to delay a main storage unit access which follows the occurrence of the serialization when the one CPU is notified of an occurrence of a serialization in one of the other CPUs prior to the occurrence of the serialization in the one CPU until the preceding serialization completes.

16. The serialization control system according to claim 15, said serialization control means further comprising:

a memory control unit operatively connected to each of said plurality of CPUs, wherein said control means comprises a latch means which is set by a serialization notification setting signal when the one CPU performs a serialization and outputs a serialization notification signal to other CPUs, and is reset by a serialization completion signal from said memory control unit, a serialization notification counter for performing a count-down of a delay time in which a serialization notification signal is transmitted from the one CPU to all of the other CPUs and producing an output, and a priority circuit for receiving serialization notification signals from the other CPUs and the output of said serialization notification counter and for preventing the one CPU from accessing said main storage unit when the serialization signals from the other CPUs reach the one CPU before the serialization notification signal from the one CPU reaches the other CPUs and for allowing the one CPU to access said main storage unit when the serialization notification signal from the one CPU reaches at least one of the other CPUs before the serialization notification signals from the other CPUs reach the one CPU.

17. The serialization control system according to claim 16, wherein said priority circuit allows the one CPU to access said main storage unit and disregards the serialization notification signals from the other CPUs when a serialization notification signal is not generated by the one CPU.

18. The serialization control system according to claim 16, wherein said priority circuit prevents the one CPU from accessing said main storage unit when at least one of the serialization notification signals from the other CPUs reaches the one CPU during a period within which the one CPU continues to transmit a serialization notification signal after the serialization notification signal from the one CPU reaches the other CPUs until the serialization notification signals from other CPUs become non-asserted, and allows the one CPU to access said main storage unit when the serialization notification signals from the other CPUs become non-asserted.

19. The serialization control system according to claim 16, wherein
said serialization notification counter comprises a count-down means having a value set by the serialization notification setting signal of the one CPU corresponding to a time period during which the serialization notification signal from the one CPU reaches the other CPUs and a decoder for detecting said value of said count-down means.

20. The serialization control system according to claim 16, wherein
said priority circuit comprises a plurality of groups each comprising a first AND gate having a first input for receiving the output of said serialization notification counter and having a second input for receiving serialization notification signals of said plurality of CPUs,
a second AND gate having a first input for receiving a respective one of the serialization notification signals from said plurality of CPUs, and
a flip-flop having an input connected to commonly connected outputs of said first and second AND gates and having an output connected to a second input of the second AND gate; and
an OR gate having a plurality of inputs, each respectively connected to the output of the flip-flop in one of said plurality of groups, for producing a serialization priority signal when the output of said flip-flop in at least one of said groups produces a logic '1' signal.

21. The serialization control system according to claim 16 including
a system control interface which distributes the serialization control signal from each CPU to all other CPUs and prevents the serialization notification signal from reaching the other CPUs when the serialization control system is not active.

22. A serialization control system for controlling a main storage unit access in an information processing apparatus, said serialization control system comprising:
a plurality of central processing units (CPUs);
a main storage unit commonly shared by said plurality of CPUs;
a memory control unit operatively connected to each of said plurality of CPUs;
a plurality of caches of high speed and small capacity in said plurality of CPUs forming a hierarchical memory apparatus together with said main storage unit;
a means for notifying an occurrence of a serialization in one of said plurality of CPUs to all other of said CPUs before the one CPU requests of said memory control unit for a serialization of main storage unit accesses; and
a means for allowing the one CPU to immediately access said main storage unit whether the one CPU is notified of an occurrence of a serialization in the other CPUs or not.

23. A serialization control method for controlling a main storage access in an information processing apparatus comprising a plurality of a main storage apparatus commonly shared by said plurality of CPUs and
a memory control unit operatively connected to each of said plurality of CPUs; said serialization control method comprising the steps of:
(a) detecting an occurrence of a serialization in a particular CPU;
(b) notifying the occurrence of the serialization in said particular CPU to all other of said plurality of CPUs before the particular CPU requests of said memory control unit for a serialization of main storage apparatus accesses;
(c) examining whether the particular CPU is notified of an occurrence of a serialization in the other CPUs;
(d) delaying a main storage apparatus access by the particular CPU which follows the occurrence of the serialization in the particular CPU when an occurrence of a serialization in the other CPUs is notified; and
(e) executing said main storage unit access by the particular CPU when the other CPUs are notified of the occurrence of the serialization in the particular CPU or a serialization by the other CPUs is completed.

* * * * *